(12) United States Patent
Hartnett et al.

(10) Patent No.: US 6,762,232 B2
(45) Date of Patent: Jul. 13, 2004

(54) MOLDED OBJECTS

(75) Inventors: James J. Hartnett, Green Village, NJ (US); Benny Smith, Kernersville, NC (US)

(73) Assignee: Longwood Industries, Inc., Florham Park, NJ (US)

( * ) Notice: Subject to any disclaimer, the term of this patent is extended or adjusted under 35 U.S.C. 154(b) by 0 days.

(21) Appl. No.: 09/732,820

(22) Filed: Dec. 8, 2000

(65) Prior Publication Data

US 2002/0111412 A1 Aug. 15, 2002

(51) Int. Cl.$^7$ ............................................. C08K 03/26
(52) U.S. Cl. ..................... 524/426; 524/427; 524/521; 524/525; 524/527
(58) Field of Search ............................. 524/426, 427, 524/521, 525, 527

(56) References Cited

U.S. PATENT DOCUMENTS

| | | | |
|---|---|---|---|
| 2,810,989 A | 10/1957 | Terry | 47/34 |
| 2,848,842 A | 8/1958 | Tennant, Jr. | 47/34 |
| 4,193,909 A | 3/1980 | Lundberg et al. | 260/42.15 |
| 4,773,182 A | 9/1988 | Weder et al. | 47/72 |
| 4,877,827 A * | 10/1989 | Van Der Groep | 524/477 |
| 4,897,031 A | 1/1990 | Weder et al. | 425/388 |
| 4,950,216 A | 8/1990 | Weder | 493/162 |
| 5,416,146 A * | 5/1995 | Kushida et al. | 524/297 |
| 5,532,068 A * | 7/1996 | Oshima et al. | 428/520 |
| 5,807,941 A * | 9/1998 | Tsuji et al. | 526/224 |
| 5,914,195 A * | 6/1999 | Hori et al. | 428/520 |
| 6,220,323 B1 * | 4/2001 | Sandstrom et al. | 524/99 |

OTHER PUBLICATIONS

James R. Purdon, "The Vanderbilt Rubber Handbook", Thirteenth Edition R.F. Ohm, Editor (1990) p. 166–182.

* cited by examiner

*Primary Examiner*—Peter D. Mulcahy
(74) *Attorney, Agent, or Firm*—Lerner, David, Littenberg, Krumholz & Mentlik, LLP

(57) ABSTRACT

A mixture comprising at least one vulcanizable elastomer, preferably in a mixture with a thermoplastic polymer, at least one mineral filler preferably including clay, at least one pigment or colorant preferably including red iron oxide, and optionally at least one odor making agent preferably including an extract of vanilla. The mixture can be molded and, after the addition of other suitable ingredients, can be vulcanized, thereby producing an object having the look and feel of natural clay, but having improved low temperature and mechanical stability. Molded objects made from the composition such as plant pots and saucers, wine bottle coolers, trivets, and other objects that typically are made from natural terra cotta or clay, have aesthetically pleasing characteristics as well as improved properties.

25 Claims, No Drawings

MOLDED OBJECTS

FIELD OF THE INVENTION

This invention relates to molding compositions containing a vulcanizable elastomer and molded objects made therefrom, particularly to molded containers having the look and feel of clay or terra cotta. More particularly, this invention relates to horticultural containers such as flowerpots and saucers as well as to containers useful for cooling beverage bottles such as wine bottles, and other molded objects that typically are made from natural terra cotta or clay such as trivets, garden ornaments, supports or feet for plant pots, dishes, spoon or utensil rests, etc.

BACKGROUND OF THE INVENTION

Natural clay has been used for generations for horticultural pots such as flowerpots and other containers as well as for making other objects. While such products made from clay are aesthetically pleasing, they are susceptible to breaking when dropped and to cracking from exposure to freeze-thaw cycles in cold weather, particularly if they are wet or contain wet soil. Consequently, in colder climates ordinary clay pots must be brought indoors during the winter months and special care must be taken in handling such pots to avoid breakage. Furthermore, clay pots are susceptible to the permeation of water and the use of an impermeable container under such pots is required to avoid damage to wood floors, carpeting, etc. Similarly, clay has limited use in producing a container for cooling beverage bottles, such as wine bottles, because of its water permeability and susceptibility to cracking due to handling as well as to exposure to low temperatures.

U.S. Pat. No. 2,810,989 describes lightweight horticultural containers made of sand coated with from 0.5 to about 15 wt. % by weight of sand of a thermosettable or thermoplastic resin, e.g., phenol formaldehyde resin or polyvinyl chloride; the resin is set following formation of the container. The amount of sand used is limited to that necessary to coat the sand particles so that the container has a high degree of capillarity in order to provide free transfer of moisture and air. The patent teaches that dry silica sand containing less than 3% clay should be used and that the resulting containers will be about 50% lighter than a standard clay pot of the same dimensions. The use of synthetic rubbers produced in latex form, such as butadiene-styrene copolymers, is also disclosed. However, their use is also limited to low concentrations, i.e., just enough to coat the sand based on the use of a rubber latex. The patent suggests that there is no advantage to using more than 15 wt. % resin by weight of the sand in the mixture.

U.S. Pat. No. 2,848,842 discloses forming plant containers from pulp furnish and including additives that inhibit root formation in order to prevent penetration of roots through the container walls. In example 2 of the reference, approximately 5 wt. % neoprene (polychloroprene) is included in the composition in the form of neoprene latex; additionally, zinc oxide and di-beta-naphthyl-p-phenylene diamine are also included as "compounding ingredients for the neoprene rubber." The function of these additives is not disclosed, but it is believed that under appropriate conditions zinc oxide can function as a curative for neoprene and the p-phenylene diamine as an antioxidant or stabilizer. The patent states that plant containers were molded by "a conventional pulp molding process", but neither general details of such a process nor the specific conditions used to mold the containers of the example are disclosed. A separate root inhibitor chemical (pentachlorophenol) was included in the composition.

U.S. Pat. No. 4,193,909 discloses a resin-aggregate mixture comprising polyurethane resin, aggregate (sand), silane compounds, iron oxide and powdered thermoplastic resins that are molded to form flowerpots and saucers, cured and subsequently are baked at a temperature sufficient to fuse the thermoplastic resin to provide a pot having air permeability but resistance to the permeation of water. The patent fails to disclose the use of several required elements of the present invention including vulcanizable elastomer, clay, and an odor masking agent. Furthermore, as a consequence of using different components in preparing the mixture of the reference, the containers molded therefrom are not disclosed as having the look and feel of clay, nor is there any indication of improved low temperature or mechanical stability.

U.S. Pat. No. 4,950,216 discloses the use of various materials to produce films or sheets that can be formed into overlapping folds so as to produce a flowerpot shape. Useful materials are said to include foil, cellophane, paper and processed organic polymer such as polypropylene and including crosslinked polymers, provided that the material is a film or sheet and is flexible. A flowerpot made from the folded sheet or film material is said to be up to 20.0 mils in thickness. Related patents U.S. Pat. Nos. 4,773,182 and 4,897,031 disclosed articles made from the sheet forming materials just described and to an apparatus for folding and forming such articles.

The general formulating and use of nitrile elastomers is described in a chapter of "The Vanderbilt Rubber Handbook", Thirteenth Edition, R. F. Ohm, Editor (1990). The chapter, written by J. R. Purdon, includes information on the use of carbon black and mineral fillers, vulcanization systems, blends, processing and properties.

It would be desirable to have improved molding compositions and molded articles made from such compositions that have the look of natural clay, are capable of being formulated so as to have the feel of natural clay, but are more resistant to breakage and cold temperatures than those fabricated from ordinary fired clay.

SUMMARY OF THE INVENTION

A composition prepared by forming a mixture comprising, on the basis of parts by weight per hundred of elastomer or rubber, phr: (a) 100 phr of at least one vulcanizable elastomer or a mixture of at least one vulcanizable elastomer with at least one thermoplastic polymer or thermoplastic elastomer; (b) from about 150 phr to about 500 phr of at least one mineral filler; (c) from about 0.1 phr to about 10 phr of at least one pigment or colorant; and (d) at least one vulcanizing agent in sufficient quantity to substantially fully vulcanize said at least one vulcanizable elastomer. Optionally the composition can include from about 0.01 to about up to about 10 phr of at least one odor masking agent. Preferably the following components are employed: the vulcanizable elastomer is a mixture of butadiene-acrylonitrile copolymers and styrene-butadiene copolymers, the mineral filler includes a significant amount of clay, the colorant includes red iron oxide and the odor masking agent, when used, is an extract of vanilla. The composition is usefully molded and vulcanized to form objects having the look of clay, are capable of being formulated so as to have the feel of natural clay, as well as having improved low temperature and mechanical stability. Useful objects molded from the composition include horticultural pots such as flower and planting pots, saucers used with such pots, beverage coolers such as wine bottle coolers and other items traditionally made from natural clay and terra cotta.

DETAILED DESCRIPTION OF THE INVENTION

In one aspect, this invention comprises a composition for molding objects such as flowerpots and similar containers having the look of clay, are capable of being formulated so as to have the feel of natural clay and based on a composition prepared by forming a mixture of a molding composition comprising, on the basis of parts by weight per hundred of elastomer or rubber, phr, in said composition:

(a) 100 phr of at least one vulcanizable elastomer;

(b) from about 150 phr to about 500 phr of at least one mineral filler;

(c) from about 0.1 phr to about 10 phr of at least one pigment or colorant;

(d) at least one vulcanizing agent in sufficient quantity to substantially fully vulcanize said at least one vulcanizable elastomer.

Optionally, the composition can be formulated to include from about 0.01 to about up to about 10 phr of at least one odor masking agent, particularly where the composition is used to prepare molded objects that are susceptible to an unpleasant odor as a consequence of the vulcanization process.

Vulcanizable elastomers useful in the present invention include natural and synthetic rubbers. Natural rubber ("NR") is the naturally occurring form of rubber known as polyisoprene. Synthetic rubbers include at least one of: synthetic polyisoprene, styrene-butadiene copolymers ("SBR"), acrylonitrile-butadiene copolymers ("nitrile", "NBR" or Buna-N rubber), ethylene-propylene copolymer rubber ("EPM"), ethylene-propylene-diene rubber also known as ethylene-propylene-terpolymer ("EPDM"), isobutylene-isoprene copolymer rubber ("butyl rubber" or "IIR"), polybutadiene rubber ("BR"), and styrene block copolymers comprising comonomers of butadiene or isoprene wherein the comonomer has been substantially hydrogenated after copolymerization, yielding segments of ethylene and/or butylene, etc. The synthetic rubbers are well known in the art and their synthesis can be found in standard textbooks as well as the patent literature.

Provided that at least one vulcanizable elastomer is present, the composition can also include a thermoplastic polymer or a thermoplastic elastomer, the latter comprising a copolymer having thermoplastic and elastomeric components or segments in the same or different polymer chains or comprising a thermoplastic polymer, e.g., polypropylene, and a vulcanized elastomer. Thermoplastic polymers are well known in the art and include polyethylene, polypropylene, polyvinyl chloride, nylon, polystyrene, etc. The ratio of thermoplastic polymer or thermoplastic elastomer to vulcanizable elastomer can be from about 15:85 to about 65:35; preferably from about 20:80 to about 55:45; more preferably from about 25:75 to about 50:50; for example about 30:70. Particularly preferred is the use of a thermoplastic polymer such as polyvinyl chloride ("PVC") in a mixture with nitrile rubber, e.g., blends of 50–80 wt. % NBR and 50–20 wt. % PVC; nitrile/PVC blends containing varying amounts of PVC are commercially available as various grades of "Paracril OZO" (Uniroyal Chemical Co.), "Krynac NV" and "Perbunan NT/VC" (Bayer Fibers), and "Europrene N OZO" (EniChem Elastomers America). The use of a thermoplastic polymer contributes to the stiffness or hardness of the molded object and also facilitates the molding operation since it softens and flows at the high temperatures used for molding the object.

Preferred vulcanizable elastomers are nitrile rubber and SBR, more particularly, mixtures of nitrile rubber (preferably blended with PVC) and SBR wherein the ratio of nitrile to SBR is from about 10:90 to about 90:10, more preferably from about 40:60 to about 60:40, for example 50:50 (where PVC is present in the nitrile rubber, the ratios expressed are with regard to the blend of nitrile rubber including the PVC). Nitrile rubber useful in the present invention is available commercially; such polymers can be selected from those having acrylonitrile in a concentration range of from about 18 to 50 wt. %, preferably from about 25 to about 45 wt. %; typically, individual NBR grades are available containing about 18, 28, 33, 40 or about 50 wt. % acrylonitrile. Blends of nitrile rubber and PVC are also available wherein the amount of PVC in the blend and the acrylonitrile level in the nitrile rubber varies. Grades are available from various manufacturers containing from about 18 to about 45 wt. % acrylonitrile ("ACN") and from about 85/15 to about 50/50 NBR/PVC; the most commonly available blend ratio is 70/30 and includes products having ACN content from about 18 to about 45 wt. %. Furthermore, nitrile rubber is also available in hydrogenated form wherein the residual unsaturation has been reduced to, e.g., from about 0.5 to about 5 wt. % from an initial level of about 15 wt. %.

SBR is available in different grades from several manufacturers varying in the target concentration of bound styrene of from about 5 to about 50 wt. %, preferably from about 15 to about 40, more preferably from about 20 to about 30 wt. %. While SBR is commercially available in premixed or "masterbatch" form containing carbon black and/or oil, carbon black containing compositions are primarily intended for the tire industry and are not useful herein. If it is decided to use an oil extended SBR masterbatch product, other components in the composition would need to be adjusted to account for the presence of the oil so as to control processability of the composition and physical properties of the finished product, e.g., whether or not a separate plasticizer is used. The "1500" series (numbered according to the generally accepted system of the International Institute of Synthetic Rubber Producers, Inc.) is particularly preferred, for example SBR 1503 having a target bound styrene of 23.5 wt. %.

Use of vulcanizable rubber in the amounts provided for in the compositions of the present invention results in a molded object that is substantially impermeable to water, particularly when the composition is molded into a container (e.g., a horticultural container such as a planting pot or a container useful for cooling wine bottles) and vulcanized. The term "substantially impermeable" is not meant to suggest that water cannot permeate the container over a sufficiently extended period of time if excess water is present, e.g. as a consequence of watering a plant where there is no drain hole present in the bottom of the container. However, a container of the present invention is not so permeable as to permit any more than a trace of water to flow through the walls of such a container in several minutes, for example a container made from such a composition in the shape of a wine cooler and filled with some water and ice may appear to "sweat", but the water in the container would not permeate through the container walls during the typical time that wine would be cooled and consumed. In contrast, the use of vulcanizable rubber as a minor component in a composition, e.g., in amounts of less than about 10 wt. %, e.g., about 5 wt. % would not be suitable. Similarly, compositions containing low rubber concentrations would be less likely to exhibit improved mechanical stability (e.g., resistance to breakage) and/or improved freeze-thaw resistance.

Curing of the rubber, also known as crosslinking or vulcanization, can be effected in several ways well known in the art of rubber vulcanization. By far the most common methods include the use of sulfur, sulfur derivatives and "accelerators" or vulcanizing agents, and also typically include the use of zinc oxide. Typical vulcanizing or accelerating agents include tetramethylthiuram disulfide ("TMTD" or "TMTDS") and tetraethylthiuram disulfide, 2-mercaptobenzothiazole ("MBT"), benzothiazyl disulfide; other accelerators include the sulfenamide type, such as N-oxydiethylene benzothiazole-2-sulfenamide, dithiocarbamate ultra accelerators, such as bismuth and zinc dimethyldithiocarbamate and cadmium diethyldithiocarbamate; these and various other agents are available commercially from R. T. Vanderbilt Company under various brand names and grades. A reference to various crosslinking, vulcanizing and curing agents useful in the present invention (as well as a summary of commercial synthetic elastomers and mineral fillers and other rubber compounding ingredients) appears in "The Rubber Handbook", Fourteenth Edition, R. T. Vanderbilt Company, Inc., 1996, R. F. Ohm, Ed., incorporated herein to the extent permitted. Other crosslinking agents useful for EPM and EPDM include peroxides, either alone or in combination with sulfur, for example, 2,5-bis(tert-butyl peroxy)-2,5dimethylhexane. Peroxides are also useful in crosslinking nitrile rubber, particularly those grades in which the unsaturation level has been substantially reduced, e.g., to about 1%, by hydrogenation. Also useful as optional ingredients to facilitate crosslinking are agents such as fatty acids, for example, stearic, palmitic, lauric, sebacic, etc. acids; particularly preferred is stearic acid. A useful textbook on the subject of rubber curing is "Vulcanization of Elastomers" by G. Alliger, incorporated herein by reference to the extent permitted. Suitable amounts of the curing agent(s) can be determined without excessive experimentation by reference to the textbook cited as well as to the patent literature relevant to each rubber type. For example, a useful crosslinking composition directed to a mixture of nitrile and SBR, preferably about a 50:50 mixture of each copolymer, includes the following amounts of the named ingredients expressed in terms of parts by weight per hundred parts by weight of rubber (phr): from about 2 to about 10, preferably from about 2.5 to about 5, for example about 3 phr zinc oxide; from about 0.5 to about 5, preferably from about 1.0 to about 3, for example about 2.0 phr sulfur; from about 0.5 to about 5, preferably from about 1.0 to about 3, for example about 1.5 phr MBT; from about 0.2 to about 4, preferably from about 0.4 to about 2, for example about 0.8 TMTD.

The use of MBT and/or zinc dimethyldithiocarbamate in combination with zinc oxide in the cure system can be particularly advantageous for a composition intended to be formed into a container used as a planter. As disclosed in U.S. Pat. No. 2,848,842, incorporated herein by reference to the extent permitted, it is taught that certain organic compounds can function as root inhibitors. Among the compounds disclosed as effective are the zinc salts of a combination of 2-mercaptobenzothiazole and dimethyldithiocarbmic acid. It will be recognized that the zinc salt of MBT is formed during the curing reaction where zinc oxide and MBT are present and the zinc salt of dimethyldithiocarbmic acid is a useful rubber crosslinking agent as noted above (The combination of such zinc salts is sold under the trade name "Vancide 51Z" by R. T. Vanderbilt for use as a fungicide for Neoprene and is noted to have accelerating effect in compounds of other elastomers). Therefore, the use of at least one of such materials, and preferably both, in the composition of the present invention can advantageously perform the dual function of rubber vulcanizing agent(s) and root growth inhibitor. As disclosed in the '842 patent, the presence of chemical root inhibitor material in the wall structure of a cellulosic fibrous plant container was surprisingly found to have no harmful effects on plants grown in such containers, e.g., no stunting. However, it was also observed that while virtually no roots were visible on the outside of the root ball, just underneath the outside layer of dirt a very effective root structure was found. Furthermore, the plants did not exhibit any pot-binding even when grown in a single pot for longer periods than normally desirable. Finally, after transplanting, such plants exhibited little or no transplanting shock and grew rapidly into the surrounding soil, giving excellent plant development. Therefore, compositions of the present invention can be expected to exhibit not only the disclosed advantages in the properties of the container itself, but, as a consequence of the components used to produce the composition of the container, a secondary benefit to plants grown in such containers can be realized. Furthermore, the above-noted crosslinking agents can be added to the composition of the present invention in slight excess of that required to accomplish the desired level of crosslinking of the rubber component(s), so that such chemicals can also be effective as root inhibitors and can be expected to exhibit their effect and either not be leached from the container walls or be leached to a lesser degree than in a water permeable, cellulosic mixture (as in the '842 patent). Therefore, it can be useful to incorporate rubber accelerators of the type described above (zinc oxide in combination with MBT and the zinc salt of dimethyldithiocarbmic acid) in an amount so as to provide an excess of that required for effective vulcanization, such excess preferably at least about 0.05 wt. % of the dry weight of the composition of the invention, more preferably at least about 0.1 wt. %; excess amounts up to about 2 wt. % may be useful, but larger amounts are unnecessary insofar as their effect as root growth inhibitors.

Mineral fillers useful in the present invention include clays, whiting (finely ground, naturally occurring calcium carbonate typically contaminated to various degrees with silica, iron, aluminum or magnesium and mined as chalk or limestone), talc, aluminum and silicon oxides and silicates such as magnesium and calcium silicates. Clays useful as fillers for rubber compounding are typically characterized as "soft" and "hard" although both are kaolin type minerals (hydrated aluminum silicate). Particularly preferred in the present invention are hard clays such as "Dixie" clay or "Par" clay (R.T. Vanderbilt Company) and whitings such as "Allied Whitings" (Akrochem Corp.), preferably in combination with one another in order to obtain the look of a clay pot (soft clays having a somewhat larger particle size can also be used). The color of the clay fillers can vary from a reddish-brown to pale buff depending on the content of iron oxide present, but the color of the mixture can be further enhanced or modified by the addition of (red or other color) iron oxide; calcium carbonates are typically white in color.

Suitable amounts of the at least one mineral filler for use in the present invention are from about 150 to about 500 phr, preferably from about 200 to about 400 phr, more preferably from about 250 to about 350 phr; for example about 300 phr. Furthermore, the mineral filler is preferably present as a mixture of two or more such mineral fillers, for example, a mixture of whiting and hard clay. One skilled in the art can readily vary the amount of each filler in order to obtain the appropriate look and feel of a natural clay pot, container or other object; for example, the composition can be varied to obtain the look and feel of terra cotta. Terra cotta is also described as having the variable color of hard baked clay, averaging reddish to red-yellow in hue, with high saturation and medium brilliance. The high loadings of mineral filler used in the composition of the present invention result in objects made from the composition having the feel of an object molded from natural clay, particularly in the sense of the weight or heft of a clay object.

The high loadings of clay can also contribute to objects having the feel of clay since the surface texture is influenced by the presence of the mineral filler(s). This can be further influenced by intentional control of the mixing or dispersion process, e.g., by avoiding too uniform a dispersion of the mineral filler. Under ordinary circumstances it is an objective in rubber processing to obtain the best possible dispersion of fillers (e.g., mineral or carbon black) in order to maximize stress-strain properties, e.g., tensile strength (as well as other properties that are affected by dispersion). However, where a high level of strength is not required for objects such as flower pots and other such containers, aesthetic qualities of the object can instead be primarily addressed. Alternatively, other materials can be included in the composition of the present invention in small amounts in order to produce a gritty or rough surface texture in the resulting object. For example, products based on ground nut shells such as "Shelblast" (C.P. Hall) or "Shell Grit" (Composition Materials) are available in different grades of varying mesh sizes. Similarly, larger particle size mineral fillers can also be employed, e.g., ground calcium carbonate, calcium nitrate and silica sand. If such materials are used, small amounts are required in order to accomplish the necessary result, e.g., from about 1 to about 25 phr, preferably from about 1 to about 20 phr; the specific amount required can readily be determined by limited experimentation. Alternatively, a surface wash or thin surface layer containing the texture can be applied to the object prior to molding or the mold used to produce the object can be modified to include the surface texture desired for the resulting object.

Colorants useful in the present invention preferably include inorganic colorants based on iron oxides; the use of such oxides generally results in dull shades of color. For example, a series of iron oxide based colors varying from dark red to yellow, tan, brown and black are available from Arkochem Corporation; in particular, tan iron oxide (grade E-8848 Tan) and red iron oxide (grade E-4238 Red) are useful in combination in order to achieve the desired color of natural clay. The colorant used can be any type having the desired color characteristics and an appropriate particle size to be distributed as desired throughout the composition. Since inorganic pigments are weak tinctorially, it is customary to use from about 0.5 to about 5 wt. %, preferably from about 0.75 to about 4.5 wt. %, more preferably from about 1 to about 4 wt. % of the total weight of the composition, depending on the hue, saturation and brilliance of the color to be achieved in the final molded, preferably cured object. The colorant(s) can be added to the mixture in a final mixing step wherein dispersion of the colorant is controlled in order to achieve the desired effect, e.g., a uniform appearance, one that is less uniform or even one containing streaks of color at the surface of the object. Furthermore, other colorants can also be employed to obtain colors in the final object other than those in the clay or terra cotta family. For example, darker and/or brighter pigments or colorants as well as organic pigments can be used so that the color of the object is dictated by selection of the pigments.

The rubber components typically employed in the mixture of the present invention as well as the vulcanizing agent(s) and their reaction by-products may produce odors that are not pleasing to all people, particularly where the object is used in a residential environment. If the odor following vulcanization is not pleasant and/or does not dissipate sufficiently, a pleasing result can be achieved by incorporating an odor masking agent (or reodorant) in the composition used to mold the object. Various materials have been used for such purposes, including various essential oils and vanilla extract or vanillin; the latter are preferred. Products are also commercially available, including those under the trade name "RODO" (RODO 0 and 10, R. T. Vanderbilt Company) that impart pleasing floral scents as well as Dallas Brand (Taber Inc.), Stan-Mask Series (Harwick Standard), etc.,. Such odor masking agents are typically used in the composition in small quantities, but the level selected depends on the subjective degree to which the unmodified odor of the composition needs to be modified; the latter can be influenced by the chemical nature of the polymers, vulcanization system and other ingredients, including the types and amounts of mineral fillers. Useful amounts of odor masking agents can be from about 0.01 to about 10 phr, typically from about 0.1 to about 5 phr, preferably from about 0.5 to about 4 phr, more preferably from about 1 to about 3 phr; for example about 2 phr.

Other common rubber compounding additives and fillers may optionally be added in minor concentrations in order to impart the properties normally attributed to their use by one skilled in the art; each such optional additional component can be added at a concentration of from about 1 to about 25 phr depending on its purpose and intended effect. For example, plasticizers and waxes can be included. The use of a plasticizer modifies the handling and processing of the mixture and can improve dispersion of the high concentration of mineral fillers in the composition; a plasticizer can also modify the physical properties of the mixture, both uncured and cured. Plasticizers include monomeric and polymeric plasticizers such as adipates, glutarates, timellitates, azelates, sebacates and tallates; a commercially available range of plasticizers is available under the trade name "Plasthall" (C.P. Hall Company); a particularly useful plasticizer is Plasthall 4141, a triethylene glycol caprate-caprylate ester type plasticizer that is recommended for use with nitrile rubbers. A useful concentration of such plasicizers is from about 2 to about 20 phr, preferably from about 5 to about 15 phr, for example about 10 phr. Other common plasticizers used in rubber compounding include mineral oils.

Also useful in the present invention is a paraffin or other wax at a concentration of about 0.5 to about 5 phr, preferably from about 1 to about 4 phr, for example about 2 phr. The use of paraffin wax can not only change the feel of the object after molding and curing, but also affect the weatherability of the molded object, for example, the ozone resistance of a composition containing nitrile rubber. The wax in such a composition tends to "bloom" or bleed to the surface of the object and provide a barrier to the detrimental effects of ozone (chemical additives are also commercially available that function as antiozonants).

Also useful in the present invention is the optional inclusion of a resin such as a coumarone-indene resin. In its original form, the resin can also act as a plasticizer for the mixture, modifying its handling and processing properties during preparation and molding of the composition. Since coumarone-indene resins are also thermosetting, the resin in the molded, cured object will be a hard resinous solid or glass. Such resins are available commercially under the trade name Cumar (Neville Chemical Company) and varying in softening point from about 10° C. to about 157° C., in iodine number (Wijs) from about 50 to about 110 and in number average molecular weight (GPC) from about 220 to about 700.

In addition to modifying the resistance of the composition to ozone, additives can be included to protect the rubber in the composition from the deleterious effects of oxygen. Phenols and aromatic amines are commercially available that function as antioxidants. Such materials include alkylated dihphenylamines (for example "Agerite Stalite" and "Agerite Stalite S" from R. T. Vanderbilt Company), modified hindered phenols, phenyl-beta-naphthylamine and other naphthylamines, etc.

Mixing the components of the mixture of this invention can be accomplished in a batch or continuous manner using conventional mixing equipment and techniques including, e.g., kneading, roller milling, extruder mixing, internal mixing (such as using a Banbury® mixer), etc. The sequence of mixing and temperatures employed are well known to the skilled rubber compounder or can be determined with only minor experimentation. The objective of such mixing is the dispersion of fillers, plasticizers, activators or accelerators and curing agents in the polymer matrix without incurring excessive heat buildup. As noted above, the degree of mixing or dispersion can be controlled to obtain the desired effect on appearance or look and feel of the object. A useful mixing procedure utilizes a Banbury mixer in which the rubber(s), mineral filler(s) and plasticizer (if used) are added and the composition mixed for the desired time or to a particular temperature to achieve adequate dispersion of the ingredients. Alternatively, the rubber(s) are initially added and fluxed and thereafter a portion of the mineral filler(s) (e.g., one to two thirds) are added along with the smaller quantities of required and optional ingredients (e.g., zinc oxide, colorant(s), odorant(s), stabilizer(s), etc.) and mixed for a short time (e.g., about 1 to 5 minutes) followed by the remainder of the filler(s) and plasticizer. Mixing is continued for about 5 to 15 minutes at a high rotor speed to effect suitable dispersion of the ingredients during which time the mixed composition can reach a temperature of about 100° C. to 160° C. Provided that the temperature of the composition during mixing is controlled so that temperatures are not reached that would prematurely activate the vulcanization system, the curatives can be added and dispersed during the terminal portion of the mixing cycle. At the conclusion of the mixing cycle in an internal mixer, the batch of mixed or compounded ingredients is dropped from the mixer, typically onto a rubber mill, and formed into sheets and cooled. If mixing is carried out using a rubber mill, the ingredients can be added in portions, with a major portion of the mineral filler(s) typically added first, in order to effect a uniform dispersion of all ingredients. By controlling the temperature of the mixture on the rubber mill (as described above when using an internal mixer) the curatives or vulcanizing agents can be dispersed into the composition at the conclusion of the mixing cycle. Alternatively, the mixed composition can be cooled and following cooling, a weighed portion of the compound is mixed in a second step on a rubber mill during which the appropriate weight of curing agent(s) and accelerator(s) are thoroughly and uniformly dispersed at relatively low temperature, e.g., about 80° C. to 110° C. in order to avoid prematurely activating the vulcanization process. If the colorant has not been added earlier in the process, it can be added in this later stage in order to control uniformity and dispersion and hence the final appearance of the object. It is also possible to prepare the composition in a mixing extruder using techniques well known in the art. As is well known to those skilled in the art of rubber compounding, the mixing device (internal mixer, rubber mill or extruder) can be operated at different speeds and with or without the use of auxiliary heating or cooling in order to apply various degrees of shear and to control the temperature of the mixture during its preparation.

Shaped objects of the composition can be formed using the fully compounded mixture (i.e., including the vulcanization system) by, e.g., injection, transfer or compression molding. As is well known to those skilled in the art, appropriate cycle times and temperatures employed with each of these molding processes differ and, furthermore, the viscosity of the compound also may need to be adjusted (e.g., by selection of polymer viscosity, amount and type of plasticizer, etc.), in order to obtain satisfactory results. The appropriate process conditions and composition viscosity can be readily determined by those skilled in the art without excessive experimentation.

Suitable curing conditions for the vulcanizable elastomer containing composition include a temperature range of from about 110° C. to about 260° C., preferably from about 130° C. to about 230° C., more preferably from about 150° C. to about 210° C.; for example about 160° C. Curing time will vary depending on the thickness of the object to be cured and the temperature selected, as is well known to those skilled in the art, and can range from about 1 to about 60 minutes, preferably from about 5 to about 45 minutes, more preferably from about 7.5 to about 30 minutes; for example, about 20 minutes at 155° C. (310° F.). The objective is to obtain a cured product in which the vulcanizable rubber component is substantially fully vulcanized or crosslinked. The time/temperature conditions required to achieve that result can be determined by curing samples of the composition in a heated laboratory press and measuring the resulting stress-strain properties or by using machines designed for such a purpose, machines that measure the resistance to oscillating torque of a small plug of the composition in a cavity while subjected to the curing temperature, e.g., an oscillating disc rheometer (see, e.g., ASTM D2084). Using such a test, optimum curing time is typically characterized as that required to reach about 95% of the maximum torque at a given temperature. Similarly, the preferred temperature can be determined by ascertaining the temperature at which torque or stress-strain properties are maximized regardless of the curing time employed. Often, commercial and cost considerations will dictate the time/temperature conditions employed; e.g., the temperature of available steam in the curing presses used, flow properties of the composition at the molding or injection pressures and temperatures in order to avoid premature crosslinking before the mold is completely filled with the composition, etc. Therefore, the term substantially fully cured can be taken as a value other than about 95% of the maximum torque referred to above; for example, it is acceptable to select a time/temperature so as to achieve from about 80 to 100% of the maximum value, preferably from about 85 to about 97.5%, more preferably from about 87.5 to about 95% of the maximum.

The objects, including containers such as flowerpots, saucers and other containers, are manufactured by placing or injecting the uncured mixture into suitable molds. The mixture is then cured by exposure of the molded article to elevated temperature for a time sufficient to substantially fully crosslink the elastomers. After curing, the objects are removed and cooled.

The compositions of this invention are useful for preparing molded objects, particularly molded containers having the look and feel of clay or terra cotta. More particularly, containers of various types can be made such as horticultural containers, for example, flowerpots and saucers, as well as containers useful for cooling beverage bottles such as wine bottles. Other molded objects can be made that typically are made from natural terra cotta or clay such as trivets, garden ornaments, supports or feet for plant pots, dishes, spoon or utensil rests, etc.

The compositions of the present invention typically have a specific gravity in the range of from about 1.75 to about 1.90; preferably from about 1.78 to about 1.85; for example, planting containers having the look and feel of natural clay (specific gravity about 2.3) that are made from the composition of the present invention can have a specific gravity of about 1.83.

The following example is given as a specific illustration of the claimed invention. It should be understood, however, that the invention is not limited to the specific details set forth in the example. All parts and percentages in the examples, as well as in the remainder of the specification, are by weight unless otherwise specified.

EXAMPLE 1

A composition corresponding to that shown in Table 1 was prepared by mixing the ingredients in a Banbury mixer operated at a low speed setting with auxiliary cooling according to the mixing sequence shown in Table 2.

TABLE 1

| Ingredient | Parts (phr) | Weight (%) |
|---|---|---|
| Paracril OZO HA (butadiene-acrylonitrile copolymer rubber)[a] | 50.00 | 11.40 |
| SBR 1503 (styrene-butadiene copolymer rubber)[b] | 50.00 | 11.40 |
| Whiting (ground naturally occurring calcium carbonate)[c] | 100.00 | 22.80 |
| Hard Clay (hydrated aluminum silicate)[d] | 200.00 | 45.60 |
| Plasthall 4141 ((plasticizer)[e] | 10.00 | 2.28 |
| Paraffin Wax | 2.00 | 0.46 |
| Cumar R-17 (coumarone-indene resin)[f] | 10.00 | 2.28 |
| Red Iron Oxide[g] | 1.25 | 0.29 |
| Tan 8848[g] | 4.00 | 0.91 |
| Vanilla Extract | 2.00 | 0.46 |
| Agerite Stalite S (mixed alkylated diphenylamines) | 2.00 | 0.46 |
| TMTD (Tetramethyl thiuram disulfide) | 0.80 | 0.19 |
| Rotax (2-mercaptobenzothiazole) | 1.50 | 0.34 |
| Zinc Oxide | 3.00 | 0.68 |
| Sulfur | 2.00 | 0.46 |

Footnotes:
[a]PVC content 30 wt. % (Uniroyal Chemical Co.)
[b]Bound styrene 23.5 wt. % (Ameripol Synpol Corp.)
[c]"Allied Whiting Superwhite", average particle size 6 microns; (Akrochem Corp.)
[d]Grade "100", 86 wt. % less than 2 microns, light cream color (Akrochem Corp.)
[e]Triethylene glycol caprate-caprylate (C. P. Hall Co.)
[f]Softening point 70° C., Wijs iodine number 85, number average molecular weight (by GPC) 500 (Neville Chemical Co.)
[g]Iron oxide (Akrochem Corp.)

TABLE 2

| Time (min.) | Operation |
|---|---|
| Start | Added nitrile and SBR rubbers |
| 1.0 | Added zinc oxide, coumarone-indene resin, paraffin wax, red and tan iron oxides, vanilla extract, whiting and Agerite Stalite S, |
| 2.0 | Add hard clay, Plasthall 4141 plasticizer |
| 4.0 | Add curatives (TMTD, Rotax, sulfur) Continue mixing Drop at 220° F. (105° C.) |

After mixing was complete the composition was sheeted off on a two roll mill; a sample of the composition was cured in the form of a test pad for 12 minutes at 320° F. (160° C.). Samples were cut from the pad for testing, yielding the results shown in Table 3.

TABLE 3

| Property | Result |
|---|---|
| Specific Gravity | 1.83 |
| Hardness, Shore A | 93 |
| Tensile Strength, psi (MPa) | 1200(8.27) |
| Elongation, % | 30 |

The above composition was also used to prepare molded flowerpots approximately 2.56 cm (6.5 in) in diameter at the top, 1.57 cm (4 in) in diameter at the bottom and about 2.36 cm (6 in) high; the pots were cured for 20 minutes at 155° C. (310° F.). A sample was qualitatively tested for resistance to fracture in a side-by-side test with a natural clay pot. Samples of each were equilibrated at about −40° C. (−40° F.) and dropped from a height of about 11.8–14.2 cm (30–36 in). The natural clay pot shattered whereas the pot prepared from the composition of the present invention remained unbroken.

We claim:

1. A composition prepared by forming a mixture comprising, on the basis of parts by weight per hundred of elastomer or rubber, phr:
   (a) 100 phr of a mixture comprising vulcanizable elastomers styrene-butadiene copolymer and butadiene-acrylonitrile copolymer and at least one thermoplastic polymer or thermoplastic elastomer comprising polyvinyl chloride;
   (b) from about 150 phr to about 500 phr of at least one mineral filler;
   (c) from about 0.1 phr to about 10 phr of at least one pigment or colorant;
   (d) at least one vulcanizing agent in sufficient quantity to substantially fully vulcanize said vulcanizable elastomers; and
   (e) from about 0.01 to about 10 phr of at least one odor masking agent;
   wherein, upon vulcanization, said composition has the look and feel of natural clay.

2. The composition of claim 1 wherein said vulcanizable elastomers further include at least one additional elastomer selected from the group consisting of natural rubber and synthetic rubber.

3. The composition of claim 2 wherein said synthetic rubber is selected from the group consisting of ethylene-propylene copolymers and terpolymers, hydrogenated styrene-containing block copolymers, polybutadiene, polyisoprene and butyl rubber.

4. The composition of claim 1 wherein the mixture of butadiene-acrylonitrile copolymer and polyvinyl chloride comprises from about 50 wt. % to about 20 wt. % polyvinyl chloride.

5. The composition of claim 4 wherein the ratio of butadiene-acrylonitrile copolymer to styrene-butadiene copolymer is from about 40:60 to about 60:40.

6. The composition of claim 5 further comprising a thermosetting resin.

7. The composition of claim 6 wherein said thermosetting resin is a coumarone-indene resin.

8. The composition of claim 1 wherein said at least one odor masking agent is selected from the group consisting of natural and artificial scents.

9. The composition of claim 8 wherein said at least one odor masking agent is an extract of vanilla.

10. The composition of claim 1 wherein said at least one mineral filler is selected from the group consisting of whiting, hard clay, soft clay, kaolin, hydrated aluminum silicate, and silica sand.

11. A vulcanized, molded object having the look and feel of natural clay prepared by:
   (1) forming a mixture of a molding composition comprising, on the basis of parts by weight per hundred of elastomer or rubber, phr:
      (a) 100 phr of a mixture comprising vulcanizable elastomers styrene-butadiene copolymer and butadiene-acrylonitrile copolymer and at least one thermoplastic polymer or thermoplastic elastomer comprising polyvinyl chloride;
      (b) from about 150 phr to about 500 phr of at least one mineral filler;
      (c) from about 0.1 phr to about 10 phr of at least one pigment or colorant;
      (d) at least one vulcanizing agent in sufficient quantity to substantially fully vulcanize said vulcanizable elastomers; and
      (e) from about 0.01 to about 10 phr of at least one odor masking agent;
   (2) molding the resultant mixture to a desired shape; and
   (3) curing or vulcanizing said shaped mixture;
   wherein, upon vulcanization, said object has the look and feel of natural clay.

12. The molded object of claim 11 further comprising a thermosetting resin.

13. The molded object of claim 12 wherein said thermosetting resin is a coumarone-indene resin.

14. The molded object of claim 13 wherein said at least one mineral filler is a mixture comprising whiting and hard clay.

15. The molded object of claim 11 wherein said object is a container structure selected from the group consisting of horticultural containers and saucers and beverage bottle coolers.

16. The molded object of claim 15 wherein said container structure is a horticultural container or a wine bottle cooler.

17. The molded object of claim 11 having improved low temperature and mechanical stability properties.

18. The molded object of claim 11 wherein said at least one vulcanizing agent is of capable of inhibiting plant root growth and is present in an amount greater than that required to substantially fully vulcanize said at least one vulcanizable elastomer and said object is a horticultural container.

19. The molded object of claim 18 wherein said at least one vulcanizing agent includes 2-mercaptobenzothiazole and or zinc dimethyldithiocarbamate.

20. A method of making a natural clay substitute or natural terracotta substitute comprising forming a mixture comprising, on the basis of parts by weight per hundred of elastomer or rubber, phr:
   (a) 100 phr of a mixture comprising vulcanizable elastomers styrene-butadiene copolymer and butadiene-acrylonitrile copolymer and at least one thermoplastic polymer or thermoplastic elastomer comprising polyvinyl chloride;
   (b) from about 150 phr to about 500 phr of at least one mineral filler;
   (c) from about 0.1 phr to about 10 phr of at least one pigment or colorant;
   (d) at least one vulcanizing agent in sufficient quantity to substantially fully vulcanize said vulcanizable elastomers; and
   (e) from about 0.01 to about 10 phr of at least one odor masking agent;
   wherein, upon vulcanization, said composition has the look and feel of natural clay.

21. The method of claim 20 wherein said mixture further comprises a thermosetting resin.

22. The method of claim 21 wherein said thermosetting resin is a coumarone-indene resin.

23. A method of making a molded object of a natural clay substitute or natural terracotta substitute having the look and feel of natural clay or natural terracotta, comprising:
   (1) forming a mixture comprising, on the basis of parts by weight per hundred of elastomer or rubber, phr:
      (a) 100 phr of a mixture comprising vulcanizable elastomers styrene-butadiene copolymer and butadiene-acrylonitrile copolymer and at least one thermoplastic polymer or thermoplastic elastomer comprising polyvinyl chloride;
      (b) from about 150 phr to about 500 phr of at least one mineral filler;
      (c) from about 0.1 phr to about 10 phr of at least one pigment or colorant;
      (d) at least one vulcanizing agent in sufficient quantity to substantially fully vulcanize said vulcanizable elastomers; and
      (e) from about 0.01 to about 10 phr of at least one odor masking agent;
   (2) molding said mixture so as to impart the structure of a desired object; and
   (3) vulcanizing said molded object.

24. The method of claim 23 wherein said mixture further comprises a thermosetting resin.

25. The method of claim 24 wherein said thermosetting resin is a coumarone-indene resin.

* * * * *